Patented Oct. 5, 1948

2,450,778

UNITED STATES PATENT OFFICE 2,450,778

SOLDER

Henri M. Boonen, Houma, La., assignor of one-half to Thomas J. Melancon, Houma, La.

No Drawing. Application February 11, 1946,
Serial No. 646,957

1 Claim. (Cl. 75—134)

This invention relates to a solder and it is a particular object of the invention to provide a solder which will properly function at low temperature, whereby the solder is particularly advantageous for use in connection with aluminum, aluminum alloys, or kindred metals.

It is also an object of the invention to provide a solder which, when applied for connecting metals, produces a joint having a strength equally as strong as the metals themselves.

The solder as herein embodied comprises the following materials in substantially the proportions stated:

|  | Per cent |
|---|---|
| Manganese | 20 |
| Aluminum (pure) | 20 |
| Magnesium | 15 |
| Copper | 5 |
| Bismuth (metallic) | 5 |
| Tin | 15 |

In the production of the solder, the zinc is brought to a molten state and a sufficient quantity of carbonate of soda added thereto to effect a thorough cleansing of the molten zinc of impurities which may be therein. The molten zinc, after being cleansed, is then mixed with the molten manganese. After the thorough mixing of the molten zinc and manganese, the mass is permitted to cool and harden.

The copper and aluminum are each separately brought to a molten state and then thoroughly mixed and to this molten mixture is added the magnesium which, within a given time, will melt and be thoroughly mixed with the molten copper and aluminum. This operation occurs when the mixture of the copper and aluminum is approximately at a temperature of 750°. This second mixture is then allowed to cool and harden.

The hardened mixture of zinc and manganese, after being returned to a molten state, has added thereto the metallic bismuth which readily melts therein and mixes therewith. While this mixture of zinc and manganese is in a molten state and at a temperature of approximately 750°, the combined aluminum, copper, and magnesium is added which will readily melt and mix. Sulphate of bismuth in powder form is then added.

The tin, while in a molten state, has added thereto a quantity of sulphate of bismuth, sufficient to assure the molten tin, when poured into the previous mixture, to evenly and thoroughly mix therewith.

By using the aluminum and magnesium in the preparation, the solder is especially adapted for use in the adjoining of aluminum, aluminum alloys, or kindred metals and it is of importance to include the manganese as the manganese prevents the solder stick from becoming too brittle or, in other words, imparts to the stick a certain amount of flexibility to facilitate the handling of the solder stick or rod.

The tin serves as an effective binder and particularly serves to allow the solder to be melted at a temperature of about 650°. This is of advantage because in the soldering of aluminum or kindred metals, a solder operation can be effected without requiring the use of heat at such a temperature which would affect the metals. The bismuth also provides a further medium to permit the solder to be melted at a temperature approximating 650°.

I claim:

A solder for aluminum and kindred metals consisting only of the following ingredients in substantially the proportions stated: manganese 20%; aluminum (pure) 20%; magnesium 15%; copper 5%; bismuth (metallic) 5%; zinc 20%; and tin 15%.

HENRI M. BOONEN.

REFERENCES CITED

The following references are of record in the file of this patent:

FOREIGN PATENTS

| Number | Country | Date |
|---|---|---|
| 252,374 | Great Britain | Mar. 18, 1926 |
| 388,979 | Great Britain | Mar. 9, 1933 |